though the desirability and utility of reducing phytotoxicity by the use of maneb in the presence of zinc ions as in Zn-maneb has long been recognized and practiced nevertheless the result is not fully satisfactory.

United States Patent Office 3,662,064
Patented May 9, 1972

3,662,064
REDUCTION OF THE PHYTOTOXICITY OF FUNGICIDIAL COMPOSITIONS CONTAINING MANGANESE ETHYLENE BISDITHIOCARBAMATE
Romke Wijmenga and Jan Wunderink, Soest, Netherlands, assignors to N.V. Chefaro Maatschappij
No Drawing. Filed Mar. 25, 1969, Ser. No. 810,342
Claims priority, application Netherlands, Apr. 4, 1968, 6804715
Int. Cl. A01n 9/20, 9/02
U.S. Cl. 424—145                1 Claim

ABSTRACT OF THE DISCLOSURE

The phytotoxicity of fungicidal compositions containing at least 80 wt. percent of manganese ethylene bisdithiocarbamate is reduced by intimately admixing therewith zinc oxide in an amount of from 0.1 to 10 wt. percent and most preferably from 0.5 to 3 wt. percent, based on the weight of manganese ethylene bisdithiocarbamate in the composition. The reduction of phytotoxicity is further enhanced by the addition to the aforementioned fungicidal compositions of a phenolic compound selected from among catechol, p-hydroquinone, metol, pyrogallol and propyl gallate, and which is added in an amount from 0.01 to 5 wt. percent, and most preferably from 0.1 to 1 wt. percent based on the weight of manganese ethylene bisdithiocarbamate.

---

This invention relates to new fungicidal compositions containing manganese ethylene bis-dithiocarbamate, and is more particularly directed to reducing the phytotoxicity of fungicidal compositions containing manganese ethylene bis-dithiocarbamate as an essential active ingredient.

The well-known fungicide manganese ethylene bis-dithiocarbamate, commonly called "maneb," is a water-insoluble compound, which precipitates, when a water-soluble manganous salt is reacted with a water-soluble salt of ethylene bis-dithiocarbamate acid in rather concentrated aqueous solution. For example, by reacting 1 part, by weight, of manganese sulphate with an equivalent quantity of disodium ethylene bis-dithiocarbamate in 10 parts, by weight, of water, a precipitate of maneb is formed.

Compositions containing maneb have been widely employed for a long time in agriculture and horticulture for combatting and/or controlling injury to plants from fungus diseases. Generally, the compositions are applied in aqueous suspension, which suspension is sprayed on the plants or fruit-trees. The preparations usually contain in addition to the maneb, adjuvants or diluents, for example, certain natural clays such as kaolin, surfactants serving as wetting agents, dispersing agents and adhering agents.

It is known that maneb is phytocidal to at least some extent and many methods have already been proposed to seek reduction of the phytotoxicity of maneb. For example, such proposed methods include reacting maneb in aqueous suspension with small amounts of water-soluble zinc or cadmium salts (United States Pat. No. 3,085,042), or reacting in aqueous solution a water-soluble zinc salt, a water-soluble manganous salt and a water-soluble salt of ethylene bis-dithiocarbamic acid in the presence of ammonium ions (Dutch patent application 289,986).

We have now found that maneb-compositions with reduced phytotoxicity and improved fungicidal activity can be prepared by intimately mixing maneb with zinc oxide. Even small amounts of zinc oxide added to the maneb result in a substantial reduction in phytotoxicity and a noticeable improvement in fungicidal activity. We further have found that the reduction is phytotoxicity and improvement in fungicidal activity are even more pronounced when small amounts of a phenolic compound are added to the maneb-compositions. In all instances, the maneb preferably constitutes at least 80 wt. percent of the total solids in the sprayable suspension.

The addition of zinc oxide and/or a phenolic compound may take place at any stage in the usual formulation of maneb-preparations. The addition can be easily effected during the mixing of maneb with the adjuvants and conditioning agents (kaolin, surfactants, dispersing agents) for obtaining a preparation with the right spray-characteristics. The mixture obtained is micronized thereafter, for example in a micronizer or in a peg or hammer-mill.

The amount of zinc oxide, which is added according to the invention, may be varied from 0.1 to 10%, by weight, based on the weight of maneb and is preferably between 0.3 and 5 wt. percent and still more preferably between 0.5 and 3 wt. percent. Very good results are obtained when zinc oxide is added to the maneb in an amount of about 1 wt. percent.

The phenolic compounds to be added to the maneb for obtaining the additional effect described above are preferably selected from among catechol (ortho-dihydroxybenzene), p-hydroquinone, metol (p-methylamino phenol), pyrogallol (1,2,3-trihydroxybenzene) and derivatives of these compounds such as propyl gallate (propyl ester of 3,4,5-trihydroxybenzoic acid). The use of catechol is preferred. It has been ascertained that the addition of only a phenolic compound to the usual maneb-preparation produces a desirable effect, but that an optimum effect is attained when the phenolic compound is added in combination with zinc oxide. The amount of phenolic compound, which is added according to the invention can be varied from 0.01 to 5 wt. percent, based on the amount of maneb, and is preferably between 0.05 and 2 wt. percent and still more preferably between 0.1 and 1 wt. percent.

The reduction of the phytotoxicity has been observed not only in connection with the application of the preparations according to the invention to young tomato plants under controlled conditions in the warehouse, but also in the application of the preparations to apple trees, as will be seen particularly in the following examples. In the experiments with tomato plants an improvement in fungicidal activity was also observed. The combination of zinc oxide and catechol added to maneb has also been found to produce a slight growth-stimulating effect.

The following examples are given to illustrate the practice of the invention and the results obtainable by its use.

EXAMPLE 1

Five aqueous suspensions were prepared starting from maneb-preparations of which the compositions are indicated in Table I.

TABLE I

| Preparation: | Composition |
|---|---|
| a | Maneb. |
| b | Zn-maneb. |
| c | Maneb in admixture with 0.5 wt. percent catechol. |
| d | Maneb in admixture with 2.5 wt. percent zinc oxide. |
| e | Maneb in admixture with 2.5 wt. percent zinc oxide and 0.5 wt. percent catechol. |

In addition to the ingredient or ingredients mentioned above, each of the preparations contained 0.5% sodium-alkylnaphthylsulfonate, 0.5% polyglycolether and 3% sodium-lignosulfonate. The amount of maneb in the dry formulation was about 83% by weight with the balance to 100% consisting of fillers, such as, kaolin and inert salts.

Preparation (b) was prepared according to Example 1 of U.S. Pat. 3,085,042 with the difference that, instead of 2% by weight of zinc sulfate monohydrate, 5% by weight of the water-soluble zinc salt was used.

Preparations (c), (d) and (e) were prepared by adding to the mixer, in which the maneb is admixed with kaolin and conditioning agents, the indicated amounts of zinc oxide and/or catechol and micronizing the obtained mixture.

The aqueous suspensions containing 2 grams of solids per liter, were applied to young tomato plants in the warehouse by spraying with the suspensions to the point of run-off. After the plants were dried they were rained upon artificially for 16 hours and dried again. A few days later the plants were sprayed with a suspension of *Phytophtora infestans* containing 30,000 sporangia per ml. Thereafter the plants were held in a very humid atmosphere for several days. The fungicidal activity and the phytotoxicity of the various preparations were determined thereafter from the observed injuries to the plants.

The fungicidal activities of the five preparations were found to be about the same, at least, substantial differences were not observed. However, the $ED_{50}$-values (i.e. the dosage in grams per liter giving a 50% control, as calculated from the countings) gave an indication that preparations (d) and (e) exhibited a somewhat better fungicidal activity. In the application of preparation (e), a slight growth-stimulating effect was also established.

The phytocidal injuries are summarized in Table II.

TABLE II

| Preparation: | Phytocidal injury |
|---|---|
| a | Heavy (more than 10%). |
| b | Heavy (more than 10%). |
| c | Moderate (about 5%). |
| d | Light (less than 1%). |
| e | None. |

From these results it appears that the preparations (c) (d) and in particular (e) exhibit a markedly reduced phytotoxicity.

EXAMPLE 2

In a way similar to that described in Example 1, aqueous suspensions of the following preparations were tested on young tomato plants (concentration of each suspension was 2 grams per liter):

TABLE III

| Preparation: | Composition |
|---|---|
| a | Maneb. |
| f | Maneb+3 wt. percent ZnO+0.1 wt. percent catechol. |
| g | Maneb+3 wt. percent ZnO+1.0 wt. percent catechol. |
| h | Maneb+0.5 wt. percent ZnO+0.1 wt. percent catechol. |
| i | Maneb+0.5 wt. percent ZnO+1.0 wt. percent catechol. |

The five preparations exhibited no substantial differences in fungicidal activity.

The phytocidal injuries found are shown in Table IV.

TABLE IV

| Preparation: | Phytocidal injury |
|---|---|
| a | Heavy. |
| f | None. |
| g | Trace. |
| h | None. |
| i | Trace. |

These experiments also indicate that the preparations according to the invention possess a strikingly reduced phytotoxicity.

EXAMPLE 3

The phytotoxicity of maneb and of a preparation according to the invention were tested on apples of the species "Golden Delicious." The effect of a spray containing maneb and sulfur on the roughness of the apples was compared with the effect of a spray with a preparation containing maneb, 3 wt. percent zinc oxide, 1 wt. percent catechol and sulfur. In each case, the sprayed aqueous suspension contained 2 grams of solids per liter with 80 wt. percent of such solids being maneb and 0.1 wt. percent being sprayable sulfur.

Around the blossom time, starting at the pre-blossoming, four sprinklings were effected with the two suspensions to be compared. After the harvest the apples were considered for their roughness. The results are shown in Table V.

TABLE V

| Preparation | Marking of the apples according to roughness | |
|---|---|---|
| | Nose, percent sound | Side, percent sound |
| Maneb plus sulfur | 72 | 83 |
| Maneb plus 3 weight percent ZnO plus 1 weight percent catechol plus sulfur | 82 | 87.5 |

EXAMPLE 4

In a way similar to that described in Example 3, the effect of sprays with maneb was compared with the effect of sprays with maneb+1 wt. percent ZnO+0.25 wt. percent catechol, with respect to the roughness of the skin of the apples from apple trees of the "Golden Delicious" species. The sprayed suspension contained 2 grams of solids per liter. In both cases, 0.05 grams per liter of "Urbazid," an organic arsenic compound available commercially from Agro Chemie N.V., Arnhem, Holland, and which is methyl-bis(dimethylthiocarbamoylthio) arsine, was added in order to further reduce the possibility of roughness. The results of the inspection of the fruits for roughness are summarized in Table VI.

TABLE VI

| Preparation | Marking of the apples according to roughness | |
|---|---|---|
| | Nose, percent sound | Side, percent sound |
| Maneb | 59 | 79 |
| Maneb plus 1 weight percent ZnO plus 0.25 weight percent catechol | 68 | 83 |

EXAMPLE 5

Five preparationss having the compositions as indicated in Table VII, were tested for phytotoxicity on young bean plants of the species "Widusa" which were in the growth-stage of the full-grown first leaves.

TABLE VII

| Preparation: | Composition |
|---|---|
| a | Maneb. |
| j | Maneb+1 wt. percent ZnO. |
| k | Maneb+1 wt. percent ZnO+0.25 wt. percent catechol. |
| l | Maneb+1 wt. percent ZnO+0.25 wt. percent metol. |
| m | Maneb+0.25 wt. percent catechol. |

Each preparation was made up to an aqueous suspension containing 5 grams solids (80 maneb) per liter water. A number of separate drops of each suspension were placed on the upper-side of the leaves of the bean plants. A needle was passed through the leaves in each drop and pulled back. The leaves were wetted daily with a small mist-squirt such that the drops did not run. After four days the undersides of the leaves were observed to determine the diameter of the leaf area injured. The experiment was repeated four times. The results are tabulated below.

TABLE VIII

| Preparation: | Relative phytotoxicity (average of five experiments) |
|---|---|
| a | 6.3 |
| j | 5.6 |
| k | 3.4 |
| l | 5.1 |
| m | 5.0 |

The values of relative phytotoxicity given above in Table VIII are based on a scale where 1.0 represents no further injury after puncture and 9.0 represents a maximum diameter for the injured area of 8 mm.

Although specific illustrative examples of the invention have been presented above, it is to be understood that the invention is not limited to such examples and that various changes and modifications may be effected therein by one skilled in the art without departing from the scope or spirit of the invention.

What is claimed is:

1. A fungicidal composition of reduced phytotoxicity consisting essentially of an intimate admixture of manganese ethylene bisdithiocarbamate, zinc oxide and catechol, in which said zinc oxide and catechol are present in the composition in amounts between 0.5–3 wt. percent and between 0.1–1.0 wt. percent, respectively, based on said manganese ethylene bisdithiocarbamate and the latter constitutes at least 80 wt. percent of the total weight of the composition.

References Cited

UNITED STATES PATENTS

| 2,457,674 | 12/1948 | Heuberger | 424—145 |
| 3,060,082 | 10/1962 | Kokurewicz | 424—286 X |
| 3,085,042 | 4/1963 | Luginbuhl | 424—286 |
| 3,436,456 | 4/1969 | Louis et al. | 424—286 X |

FOREIGN PATENTS

| 0289986 | 1963 | Netherlands. |

ALBERT T. MEYERS, Primary Examiner

D. J. FUNDERBURK, Assistant Examiner

U.S. Cl. X.R.

424—286, 346